March 26, 1935.  G. W. CLARK  1,995,795
CASING FOR BICYCLE ACCESSORIES
Filed May 17, 1934
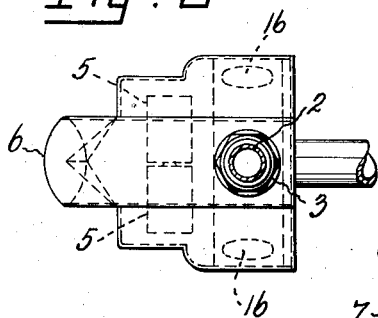
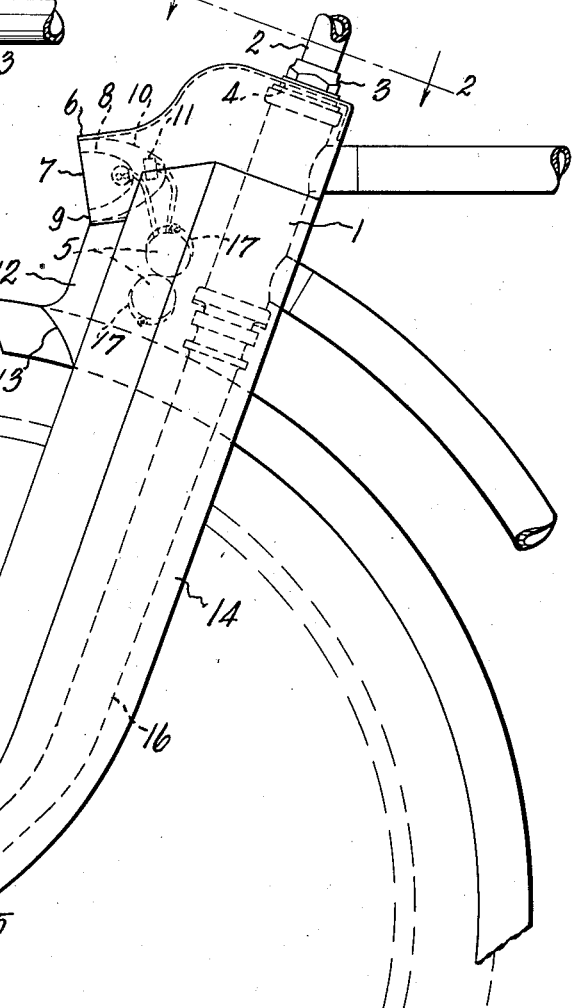
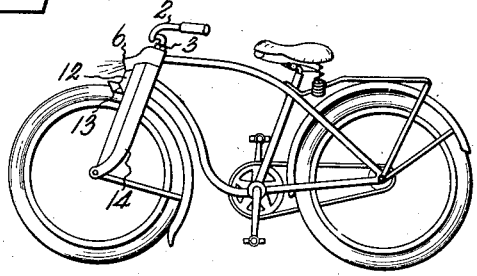
INVENTOR
GEORGE W. CLARK
BY Chapin & Neal
ATTORNEYS Patented Mar. 26, 1935

1,995,795

UNITED STATES PATENT OFFICE 1,995,795

CASING FOR BICYCLE ACCESSORIES

George W. Clark, Westfield, Mass., assignor to The Westfield Manufacturing Company, Westfield, Mass., a corporation of Massachusetts Application May 17, 1934, Serial No. 726,067

7 Claims. (Cl. 208—145)

This invention relates generally to an improvement in bicycle construction and specifically to a new and useful way of carrying bicycle equipment.

The new structure is disclosed by the accompanying drawing and following description.

In the drawing,

Fig. 1 is a side view of the casing for carrying and mounting bicycle accessories such as an electric lamp, horn, battery and wiring, and with room for more if desired; parts of the bicycle are indicated in this view;

Fig. 2 is a view looking down from line 2—2 of Fig. 1 with most of the bicycle parts omitted;

Fig. 2—A is a section on line 2A—2A of Fig. 2; and

Fig. 3 shows a complete bicycle with the casing mounted on it, indicating the way in which the usual cumbersome accessories can be efficiently grouped into one casing to give the bicycle a desired clean line appearance free from the overdressed appearance due to needed accessories.

The combined casing and means for mounting accessories are preferably made of sheet metal to give a one-piece appearance. Its specific design may be varied and the one shown is illustrative of one design arranged with artistic merit. Structurally the casing comprises a hood or cap portion 1 at the top. This is preferably closed at the front, sides, and top but open at the back to accommodate the steering. The top wall of portion 1 is clamped on the handlebar post 2 by the nut 3 and against underlying flange 4 so as to move with post 2 in steering.

The side walls of the hood are wide enough to hide the head post of the bicycle and extend forwardly far enough to provide room for mounting dry batteries, indicated at 5. These may be conveniently held in the space by spring clips indicated at 17, or in other ways.

The front wall near the top is preferably shaped into a lamp casing form 6 with window opening 7. In the space back of the window I prefer to mount a reflector 8 and lamp, as indicated. The usual glass in front of the reflector may be mounted in a frame providing for an annular screened opening 9 for the emission of vibrations from an electric horn indicated by sound reflector 10 and vibrator 11 operated from the batteries 5 which also operate the lamp. Combined lamp and horn casings of this general character are known. And my plan is to use such a combination of lamp, horn, and batteries mounted as indicated in top hood 1 of my casing. The latter is now the casing for lamp, horn, batteries, wiring and switches. Of course these accessories could be mounted with advantage in the hood 1 in various other ways than that shown. For example, the openings for the light and sound might be separated so as to indicate a lamp face and a horn face at the front of the hood. A common opening in the hood, however, is preferred.

The side walls of the hood may be narrowed as they extend forwardly and this is preferable to give a wedge shape or streamline "prow" form in the front wall. I have indicated this in Fig. 2. The upper part of the hood in the front wall is somewhat enlarged to accommodate the lamp and horn parts. But below these parts I prefer to bring the front wall into a V-form, as indicated at 12. This sharp front is gradually stepped back (see Fig. 2) toward the wide side walls at the rear for steering. The front wall of the hood, as shown, is brought down to merge with the front mudguard at the top and join it on line 13.

Thus, the casing hood at the top covers the front of the bicycle between the steering post and the sides of the mudguard and contains all the accessories hidden within the hood, with only an opening sufficient for them to function.

From the sides of the mudguard skirts 14 extend from the hood 1 down the sides of the forks to cover the latter, somewhat like the chaps of a cowboy cover his legs. The skirts at the bottom are preferably narrowed to merge with the end of the fork 16 and are fastened to opposite ends of the front wheel shaft 15 by its nuts as indicated. The shape of the front of these skirts 14 is indicated in Figs. 2 and 3, from which it will be seen that the bicycle fork is completely hidden from the front of the bicycle, which I prefer to accomplish for the sake of simplicity in appearance.

It will be seen from the foregoing description that the space enclosed by the parts of the casing which give a single-piece appearance, is more space than is necessary for the mere accommodation of the contained bicycle accessories. Ordinarily one would not deliberately make a casing too large for what it is primarily intended to contain. And this has resulted in various and "bulbous" accessories being attached to bicycles until with separate lamp casings, horn casings, battery box, and wiring between, the whole assembly of these various items has overdressed the bicycle.

One of the features of my invention herein disclosed is the plan of making my one accessory casing for all usual accessories (except the luggage carrier at the rear) somewhat as the figurehead of a ship, and large enough to hide the front vehicle parts (except the wheel and handlebars), and give the figurehead function. The result is that one looking at the whole bicycle, as in Fig. 3, will get the impression that the accessory casing is a real part of the bicycle mechanism (as a combined head bar and fork) and the impression of an accessory casing will be lost, as the dominating impression of the head piece from front axle shaft to handle post will stand out as a real part of the bicycle. The harmonizing of the casing and frame colors and decoration will help. The idea is to have the accessory casing give the illusion that it is what steers the front wheel when the handlebar is turned. This will completely free the bicycle from the appearance that it is carrying too much "junk". And instead of that, the bicycle with my invention on it will have an appearance as if it were stripped for action, even when the fact is that it is carrying complete accessory equipment, and with room for more if wanted. This not only makes a convenient casing but greatly improves the appearance of the bicycle.

Having disclosed my invention, it is perfectly apparent that it can be embodied in many variations both from a structural and artistic viewpoint. I do not wish to be limited to the preferred form shown but point out the features I want protected in the following claims.

I claim:

1. The combination of a bicycle and a streamlined shield extending from the top of the head post down to the front wheel shaft and straddling the front wheel, said shield having a one-piece appearance and hiding the front of the bicycle except its wheel and the steering means above the frame, said shield having side walls to hide the frame at the sides from the top of the head post down to the bottom of the fork members, a window opening in the front wall of the shield in position for the rays of a lamp to shine through or the emission of horn noise, said shield as a whole giving its figurehead appearance to the bicycle and fastened to turn from top to bottom as a single piece with the handlebars and front wheel, said shield having internal space to hold bicycle accessories such as lamp, horn, batteries and wiring and hide the same from view.

2. A combined lamp, horn, wiring, and battery box casing adapted for attachment as a front and decorative shield for an ordinary bicycle, said shield being hood-shaped at the upper portion and forked-shaped at its lower portion and of a length to provide for attachment at the ends of the front axle and at the top of the bicycle head post to hide the head post and fork members of the bicycle from the front and also hide the fork members from the sides.

3. A casing for shielding the accessory equipment of a bicycle such as lamp, horn, wiring, and battery parts, comprising side walls extending longitudinally from the front axle to the top of the head post and transversely from a line just back of the head post and the fork members to a line drawn parallel to the head post from the bottom of the fork members to the upper part of the casing, a front wall extending from just above the front wheel to the top part of the casing and a hood or cap portion on top of the casing, all parts of the casing being mounted to turn with the front wheel with the appearance of a rudder post extending from the front axle to the handlebar post and with the bicycle head post and fork members inside the casing hidden from view, said casing walls extending far enough forwardly of the head post to provide space to contain and hide the accessory equipment for the bicycle and means on the casing to mount such accessories for occupancy therein.

4. A combined accessory casing and shield for the front end of a bicycle comprising walls to cover the fork members and head post of the bicycle and provide space between the head post and front wall of the shield to mount a lamp or horn or both and operating means therefor within the casing walls hidden from view, and a window means in the front wall of the casing to cooperate with the bicycle accessories within the casing, the rear of said casing being left open to provide for mounting the casing on the steering parts of the bicycle to turn therewith and for ready access to the accessory space within the casing.

5. The combination with a bicycle of a casing for carrying accessory equipment comprising an open-backed hood portion clamped on the steering post to turn therewith, said hood portion hiding the head post from view by its top, front and side walls, the side walls being spaced far enough apart for steering purposes and the front wall being spaced far enough forwardly of the head post to contain and hide from view bicycle accessories wanted at the front of the bicycle such as a lamp, horn and batteries, and means within the casing to mount the accessories for their function, the side walls of the hood portion being extended downwardly on each side of the front wheel alongside of and in front of the fork members to hide the latter, said extended side walls being fastened at opposite ends of the front axle of the bicycle, all for the purpose described.

6. A container for bicycle accessories adapted to be located at the front of the bicycle and completely hide the head post except from the rear, said container comprising top, front, and side walls all adapted to turn with the steering post by attachment thereto and avoid cramping against the frame by sufficiently spaced side walls and open rear side, and means within the container forwardly of the head post position to mount accessories such as a lamp or horn and to hold batteries and wiring therefor, said container being shaped and adapted for attachment to the bicycle to give the dominating appearance thereto of a swivelling head post operable by the handlebars and thus subordinating its suggestion of an accessory container.

7. An accessory casing for bicycles comprising an enlarged lamp casing adapted to contain lamp, horn, batteries, and wiring and having top, side, and front walls arranged to hide the head post of a bicycle and with front openings in the casing for light and sound, an integral fork-shaped support for said casing arranged to stradle the front bicycle wheel and adapted to be attached at the bottom to opposite sides of the front wheel axle, and means at the top of said casing for attaching it to the bicycle steering post, all arranged as a combined accessory casing for movement as a unit with the steering post and bicycle fork and in front of the head post and forks of a bicycle and serving as a decorative feature for the bicycle after the fashion of a ship's figurehead.

GEORGE W. CLARK.